(12) United States Patent
Matsumura et al.

(10) Patent No.: US 11,456,090 B2
(45) Date of Patent: Sep. 27, 2022

(54) INSULATED ELECTRICAL CABLE WITH INNER SHEATH LAYER

(71) Applicant: Sumitomo Electric Industries, Ltd., Osaka (JP)

(72) Inventors: Yutaka Matsumura, Osaka (JP); Shigeyuki Tanaka, Osaka (JP); Taro Fujita, Osaka (JP); Takaya Kohori, Kanuma (JP); Masayuki Ishikawa, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/268,214

(22) PCT Filed: Jul. 19, 2019

(86) PCT No.: PCT/JP2019/028490
§ 371 (c)(1),
(2) Date: Feb. 12, 2021

(87) PCT Pub. No.: WO2020/044850
PCT Pub. Date: Mar. 5, 2020

(65) Prior Publication Data
US 2021/0319929 A1    Oct. 14, 2021

(30) Foreign Application Priority Data
Aug. 27, 2018    (JP) .............................. JP2018-158427

(51) Int. Cl.
*H01B 7/18* (2006.01)
*B60R 16/023* (2006.01)
*B60T 17/00* (2006.01)

(52) U.S. Cl.
CPC ............. *H01B 7/18* (2013.01); *B60R 16/023* (2013.01); *B60T 17/00* (2013.01)

(58) Field of Classification Search
CPC ........ H01B 7/18; H01B 7/0009; H01B 3/441; H01B 7/295; H01B 3/448; H01B 3/447;
(Continued)

(56) References Cited

U.S. PATENT DOCUMENTS 9,127,110 B2 * 9/2015 Sugita .................. C08K 5/5415
9,640,299 B2 * 5/2017 Sugita ................. C08L 23/0853
(Continued)

FOREIGN PATENT DOCUMENTS

JP     2000-322934 A    11/2000
JP     2006-200073 A    8/2006
(Continued)

OTHER PUBLICATIONS

Xu et al. Determining elastic modulus from dynamic mechanical analysis: A general model based on loss modulus data (Year: 2018).*

*Primary Examiner* — Timothy J Thompson
*Assistant Examiner* — Michael F McAllister
(74) *Attorney, Agent, or Firm* — Baker Botts L.L.P.; Michael A. Sartori

(57) ABSTRACT

Provided is an insulated electrical cable including: a core wire made up of at least one insulated wire including a conductor and an insulating layer covering the conductor; an inner sheath layer covering the core wire; and an outer sheath layer covering the inner sheath layer. The inner sheath layer has an elastic modulus A at −30° C. in a range from 10 MPa to 1000 MPa.

6 Claims, 1 Drawing Sheet

(58) Field of Classification Search
CPC .......... H01B 7/28; H01B 7/02; B60R 16/023; B60T 17/00
USPC ...................................................... 174/110 R
See application file for complete search history.

(56) References Cited

U.S. PATENT DOCUMENTS

| | | | | |
|---|---|---|---|---|
| 9,928,937 B2* | 3/2018 | Tanaka | ................... | H01B 3/441 |
| 2007/0272426 A1* | 11/2007 | Dell'Anna et al. | ...... | H01B 3/20 |
| | | | | 174/25 C |
| 2008/0281037 A1* | 11/2008 | Karjala | ................... | C08F 10/14 |
| | | | | 526/348.3 |
| 2010/0163272 A1* | 7/2010 | Inagaki | ................... | H01B 3/44 |
| | | | | 174/110 SR |
| 2012/0292077 A1* | 11/2012 | Sugita | ..................... | C08C 19/28 |
| | | | | 174/110 SR |
| 2014/0182883 A1* | 7/2014 | Sugita | ............... | C09D 123/0853 |
| | | | | 525/286 |
| 2015/0147571 A1* | 5/2015 | Alexander | ............. | C08L 23/04 |
| | | | | 524/517 |
| 2017/0309373 A1* | 10/2017 | Tanaka | ............... | H01B 13/0221 |
| 2018/0182508 A1* | 6/2018 | Tanaka | ................... | H01B 3/448 |
| 2018/0182511 A1 | 6/2018 | Tanaka et al. | | |
| 2019/0172606 A1* | 6/2019 | Kohori | ................ | H01B 7/0009 |
| 2019/0198193 A1* | 6/2019 | Tanaka | ................... | H01B 3/447 |
| 2019/0228874 A1* | 7/2019 | Kohori | ................ | H01B 11/002 |

FOREIGN PATENT DOCUMENTS

| | | |
|---|---|---|
| JP | 2015-156386 A | 8/2015 |
| WO | 2017/191698 A1 | 11/2017 |

* cited by examiner

INSULATED ELECTRICAL CABLE WITH INNER SHEATH LAYER

TECHNICAL FIELD

The present disclosure relates to an insulated electrical cable. The present application claims priority to Japanese Patent Application No. 2018-158427 filed on Aug. 27, 2018, the disclosure of which is hereby incorporated by reference in its entirety.

BACKGROUND ART

For an electric parking brake (EPB) system mounted on a vehicle, an insulated electrical cable (EPB cable) is used to electrically connect a caliper in a wheel house to an electronic control unit in the body of the vehicle. The EPB cable and a wheel speed sensor cable (WSS cable) for transmitting a wheel speed sensor signal usually have a structure in which a core wire is covered with a sheath, the core wire includes at least one insulated wire made up of a conductor and an insulating layer covering the conductor, and the sheath is made up of two layers, i.e., an inner sheath layer (first coating layer) and an outer sheath layer (second coating layer) covering the inner sheath layer. For example, PTL 1 (Japanese Patent Laying-Open No. 2015-156386) discloses an insulated electrical cable including: an insulated wire made up of a conductor and an insulating layer covering the conductor; a core wire (stranded wire) formed of a plurality of the insulated wires twisted together; a tape member covering the core wire; an inner sheath layer covering the tape member; and an outer sheath layer covering the inner sheath layer, and also discloses use of the insulated electrical cable as an EPB cable (paragraph 0020).

An insulated electrical cable to be mounted on a vehicle such as EPB cable and WSS cable is required to have resistance to stone damage and the like while the vehicle is running (resistance to scratch, i.e., resistance to damage), for example. Further, such a cable is also required to have appropriate flexibility for improving routing of the cable. In view of this, an insulated electrical cable has widely been used in which the outer sheath layer is made of polyurethane resin for the sake of the resistance to scratch and the flexibility, for example, and the inner sheath layer is made of polyethylene resin for the sake of cost saving, for example.

CITATION LIST

Patent Literature

PTL 1: Japanese Patent Laying-Open No. 2015-156386

SUMMARY OF INVENTION

The inventors of the present invention have conducted studies to eventually find that the flexibility of the inner sheath layer has a significant influence on the flex resistance of the insulated electrical cable. The inventors have found that the inner sheath layer having an elastic modulus at a low temperature that falls within a given range can improve the flex resistance at low temperatures without impairing the routing of the insulated electrical cable, and accordingly reached the present disclosure.

According to an aspect of the present disclosure, an insulated electrical cable includes:

a core wire made up of at least one insulated wire including a conductor and an insulating layer covering the conductor;
an inner sheath layer covering the core wire; and
an outer sheath layer covering the inner sheath layer.
The inner sheath layer has an elastic modulus A at −30° C. in a range from 10 MPa to 1000 MPa.

DETAILED DESCRIPTION

Figure 1:
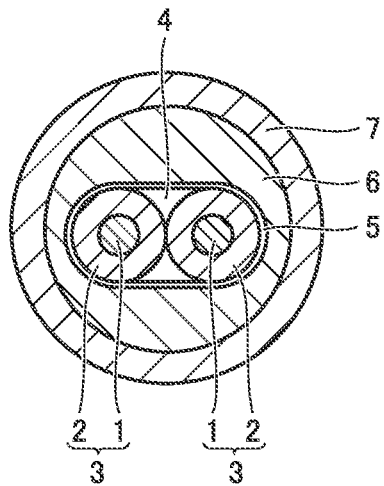
FIG. 1 is a cross-sectional view showing a structure of an example embodiment of an insulated electrical cable of the present disclosure.

Problem to be Solved by the Present Disclosure

An insulated electrical cable mounted on a vehicle such as EPB cable and WSS cable may be broken or deteriorated, for example, due to repeated flexure of the cable while the vehicle is running. Therefore, the insulated electrical cable is required to have excellent flex resistance which is resistance to break and deterioration, for example, resultant from flexure. For the insulated electrical cable to be mounted on a vehicle, use of the cable in an environment from a low temperature of approximately −40° C. to a high temperature of approximately 120° C. has to be taken into consideration. At low temperatures, break due to repeated flexure, for example, is likely to occur. As such, particularly improvement of the flex resistance at low temperatures is required. While some products of the insulated electrical cable to be mounted on a vehicle meet this requirement, further improvement of the flex resistance at low temperatures has been required in order to further improve the reliability.

An object of the present disclosure is to provide an insulted electrical cable including: a core wire made up of at least one insulted wire; and two sheath layers covering the core wire, i.e., an inner sheath layer and an outer sheath layer covering the inner sheath layer, and the insulated electrical cable is particularly excellent in flex resistance at low temperatures, and used suitably as an EPB cable or the like.

Advantageous Effect of the Present Disclosure

According to the present disclosure, an insulated electrical cable is provided that includes: a core wire made up of at least one insulated wire including a conductor and an insulating layer covering the conductor; an inner sheath layer covering the core wire; and an outer sheath layer covering the inner sheath layer, and the insulated electrical cable is excellent in flex resistance even at low temperatures of approximately −40° C. to 0° C. The insulated electrical cable of the present disclosure is excellent in flex resistance at low temperatures, and thus used suitably as a cable for signals or for grounding to be mounted on a vehicle, such as an EPB cable or a wheel speed sensor cable (WSS cable).

Description of Embodiments of the Present Disclosure

In the following, embodiments of the present disclosure are described specifically. The present invention is not limited to the embodiments below, but includes all variations falling within the scope of claims as well as all variations equivalent in meaning and scope to the claims.

According to an aspect of the present disclosure, an insulated electrical cable includes:

a core wire made up of at least one insulated wire including a conductor and an insulating layer covering the conductor;

an inner sheath layer covering the core wire; and an outer sheath layer covering the inner sheath layer, the inner sheath layer having an elastic modulus A at −30° C. in a range from 10 MPa to 1000 MPa.

The insulated electrical cable according to this aspect is characterized in that the inner sheath layer covering the core wire has an elastic modulus A at −30° C. in a range from 10 MPa to 1000 MPa. This characteristic makes it unlikely that the cable is broken or deteriorated, for example, even when used at low temperatures of approximately −40° C. to 0° C., and thus the insulated electrical cable excellent in flex resistance at low temperatures is provided. This elastic modulus A more preferably falls in a range from 10 MPa to 500 MPa, and the elastic modulus falling in this range enables more excellent flex resistance at low temperatures.

First, each of elements that form the insulated electrical cable of the present disclosure is described.

(1) Core Wire

The core wire is made up of at least one insulated wire. When the core wire is made up of a single insulated wire, the insulated wire itself is the core wire. When the core wire is made up of two or more (a plurality of) insulated wires, an assembly of these insulated wires is the core wire. When the core wire is an assembly of a plurality of insulated wires, the core wire may be a stranded wire made up of a plurality of insulated wires that are twisted together, for example. When the insulated electrical cable is an EPB cable, for example, the core wire may be formed by twisting together two or more insulated wires that have respective conductors with a cross-sectional area in a range from about 1.5 mm$^2$ to 3.0 mm$^2$ and have respective diameters substantially identical to each other. When the insulated electrical cable is a cable for signals or grounding, such as wheel speed sensor (WSS) cable, the core wire may be a single insulated wire having a conductor with a smaller cross-sectional area than the EPB cable, or the core wire may be formed by twisting together two or more insulated wires that have respective diameters substantially identical to each other (insulated wires having respective conductors with a smaller cross-sectional area than the EPB cable).

A single core wire may include insulated wires for two or more different uses. For example, a single core wire may also be formed by twisting together two or more insulated wires for EPB having respective conductors with a cross-sectional area in a range from about 1.5 mm$^2$ to 3.0 mm$^2$ and having respective diameters substantially identical to each other, and one or more insulated wires to be included in a cable for signals or for grounding, having respective conductors with a smaller cross-sectional area than the EPB wires and having respective diameters substantially identical to each other.

(2) Insulated Wire

At least one insulated wire that forms the core wire includes a conductor and an insulating layer covering the conductor.

The conductor is a wire made of a material having electrical conductivity and flexibility, such as copper, copper alloy, aluminum, aluminum alloy, or the like. As the conductor for an EPB cable, a stranded wire is often used that is made up of several tens to several hundreds of twisted thin elemental wires each having an outer diameter of approximately 0.1 mm. When the conductor is used for a power wire to be used for power feeding (EPB cable for example), the conductor has a cross-sectional area (the sum of respective cross-sectional areas of a plurality of elemental wires) in a range preferably from 1.5 mm$^2$ to 3.0 mm$^2$, more preferably from 1.6 mm$^2$ to 2.5 mm$^2$. When the conductor is used for a cable to be used as a signal wire (WSS cable for example) smaller in cross-sectional area than the power wire, a stranded wire is often used having the conductor with a cross-sectional area in a range preferably from 0.13 mm$^2$ to 0.5 mm$^2$, more preferably from 0.18 mm$^2$ to 0.35 mm$^2$. The stranded wire herein includes, in addition to a stranded wire made up of elemental wires twisted together, a stranded wire made up of stranded wires twisted together (an assembly of stranded wires), and a stranded wire made up of assemblies of stranded wires twisted together.

The insulated wire can be formed by a method similar to that for usual insulated electrical wires. For example, the outer periphery of the conductor as described above can be covered with a resin by the melt extrusion to form the insulating layer. After the conductor is covered, the resin forming the insulating layer may be cross-linked by applying ionizing radiation or the like.

An example of the resin forming the insulating layer may be polyolefin resin, preferably flame-retardant polyolefin resin. For example, flame-retardant polyethylene to which the flame-retardant property is imparted by adding a flame retarder can form the insulating layer. Flame-retardant polyolefin resin can be used to form the insulating layer to ensure the flame-retardant property and the electrical insulation of the core wire (insulated wire) even when the core wire (insulated wire) is partially exposed by removal of the coating layer and a film-like coating material (tape member).

Examples of the polyolefin resin include, but are not limited to, high density polyethylene (HDPE), low density polyethylene (LDPE), linear low density polyethylene (LLDPE), very low density polyethylene (VLDPE), ethylene-vinyl acetate copolymer resin (EVA), ethylene-methyl acrylate copolymer resin (EMA), and ethylene-ethyl acrylate copolymer resin (EEA). Examples of the material that forms the insulating layer include materials other than polyolefin resin, such as fluorine resin.

When the insulated wire is an EPB insulated wire to be used for an EPB cable, the thickness of the insulating layer is preferably in a range from 0.2 mm to 0.8 mm, more preferably in a range from 0.25 mm to 0.7 mm. The outer diameter of the insulating layer is preferably in a range from 2.5 mm to 4.0 mm, more preferably in a range from 2.5 mm to 3.8 mm.

(3) Film-Like Coating Member (Tape Member)

Between the core wire and the inner sheath layer, a thin film-like member (film-like coating member) that covers the core wire may be disposed. For example, a tape-like member (tape member) may be wound around the outer periphery of the core wire to cover the entire outer periphery of the core wire. In this case, the tape member may be removed to easily separate the core wire from the inner sheath layer and thereby expose the core wire.

As a material forming the tape member, preferably a material having a flexibility that enables easy winding, having a strength that imparts resistance to breakage due to flexure of the cable or the like, and not being caused to melt or deform for example due to the heat for forming the coating layer (melt extrusion of resin) is used. Specifically, for the sake of the strength that imparts resistance to breakage due to repeated flexure and the ease of winding around the outer periphery of the core wire, for example, paper made of pulp, nonwoven fabric made of a resin material such as polyester, polyester paper, polyester film, nylon film, polyolefin film, polyimide film, liquid crystal polymer film, fluororesin film, or the like may be used.

Preferably, the thickness and the shape (width, for example) of the tape member and the material for the tape member are selected in consideration of the strength and the ease of winding.

(4) Inner Sheath Layer (First Coating Layer)

In order to protect the core wire, the insulted electrical cable of the present embodiment includes a coating layer (sheath) that covers the outer periphery of the core wire (the outer periphery of the film-like coating member if the film-like coating member is disposed), and the coating layer (sheath) is made up of at least two layers: inner sheath layer and outer sheath layer.

As indicated above, the inner sheath layer forming the insulated electrical cable of the present embodiment has an elastic modulus A at −30° C. in a range from 10 MPa to 1000 MPa. The elastic modulus A means a storage elastic modulus at −30° C. measured according to JIS-K7244-1 (1998) using a dynamic viscoelasticity meter under the conditions that strain is 0.08%, frequency is 10 Hz, and temperature rise rate is 10° C./min.

The inner sheath layer having an elastic modulus A at −30° C. of 1000 MPa or less makes the insulated electrical cable flexible, so that the insulated electrical cable excellent in flex resistance at low temperatures is obtained. In contrast, if the inner sheath layer has an elastic modulus A at −30° C. of less than 10 MPa, the cable does not have the self-standing property and accordingly routing of the cable is difficult. Preferably, the elastic modulus A at −30° C. falls in a range from 10 MPa to 500 MPa. The elastic modulus A in this range enables an insulated electrical cable that is excellent in flex resistance at low temperatures and easy to route to be obtained.

As the insulated electrical cable of the present embodiment, particularly an insulated electrical cable in which the inner sheath layer has an elastic modulus A (MPa) at −30° C. and a coefficient of linear expansion B (1° C.) satisfying A×B<0.5 (MPa/° C.) is preferred. Here, coefficient of linear expansion B is a value determined by dividing the difference between the sample length at −30° C. and the sample length at 25° C. measured under the conditions that strain is 0.08%, frequency is 10 Hz, and temperature rise rate is 10° C./min, by the sample length at 25° C. and the temperature difference (55° C.).

In the insulated electrical cable of the present embodiment, the inner sheath layer has an elastic modulus A at −30° C. and an elastic modulus C at 25° C. preferably satisfying A/C<30, more preferably satisfying A/C<10. When this relation is satisfied, an insulated electrical cable having excellent flex resistance in a wide temperature range from room temperature of approximately 30° C. to a low temperature of approximately −40° C. can be manufactured. In particular, an insulted electrical cable in which the inner sheath layer has an elastic modulus C at 25° C. of 1 MPa or more and 30 MPa or less is preferred. The inner sheath layer having elastic modulus C in the above-identified range can be used to enable an insulated electrical cable excellent in flex resistance at room temperature and easy to route to be obtained.

Elastic modulus C at 25° C. means a storage elastic modulus at 25° C. measured according to JIS-K7244-1 (1998) using a dynamic viscoelasticity meter under the conditions that strain is 0.08%, frequency is 10 Hz, and temperature rise rate is 10° C./min.

The resin (base resin) forming the inner sheath layer is not particularly limited, as long as the resin is flexible at low temperatures and enables the inner sheath layer (inner sheath layer to which other components have been added and/or in which the resin has been cross-linked, if the addition and/or the cross-linking are done) to have an elastic modulus A at −30° C. in a range from 10 MPa to 1000 MPa. The insulated electrical cable, however, is often required to be excellent in flame-retardant property, wear resistance, and thermal resistance, and therefore, preferably a resin that can impart flame-retardant property, wear resistance, and thermal resistance to the insulated electrical cable is preferably used.

Specifically, examples of the resin forming the inner sheath layer may include polyolefin resins such as polyethylene and EVA, polyurethane elastomer, polyester elastomer, and resins that are each a mixture of them. The inner sheath layer can be formed of a polyurethane elastomer to improve the wear resistance of the cable. The inner sheath layer can be formed of a polyester elastomer to improve the thermal resistance of the cable. In order to improve the flame-retardant property of the cable, a flame retarder may be added. Moreover, the resin forming the inner sheath layer may be cross-linked by applying ionizing radiation or the like.

In the case of the polyolefin resin, it is easy for the inner sheath layer formed of this resin to have an elastic modulus A at −30° C. in a range from 10 MPa to 1000 MPa, have an elastic modulus A at −30° C. and a coefficient of linear expansion B satisfying a relation A×B<0.5 (MPa/° C.), and have an elastic modulus A at −30° C. and an elastic modulus C at 25° C. satisfying a relation A/C<30. It is therefore preferable to use polyolefin resin. Moreover, in terms of the ease of selection of a resin having properties such as excellent thermal resistance and ease of extrusion, it is preferable to use polyolefin resin.

Among polyolefin resins, polyethylene resin is more preferable in terms of cost saving, for example. Particularly, as a resin (base resin) forming the inner sheath layer, a resin containing more than or equal to 40% by mass of VLDPE at a density of more than or equal to 0.85 g/cm$^3$ and less than or equal to 0.89 g/cm$^3$ is preferable. When the resin containing VLDPE at a density of less than 0.85 g/cm$^3$ as a main component is used, the resin has a lower melting point and the thermal resistance of the cable is likely to be lowered. In contrast, it is considered that, when the resin containing more than or equal to 40% by mass of VLDPE at 0.89 g/cm$^3$ or less is used, it is easy to allow the elastic modulus A at −30° C. of the inner sheath layer to fall in a more preferred range from 10 MPa to 500 MPa, so that the cable particularly excellent in flex resistance at low temperatures is easier to obtain.

The aforementioned resin containing more than or equal to 40% by mass of VLDPE includes both the resin made up of VLDPE only, and the resin containing VLDPE and other components to the extent that does not impair what is intended by the present disclosure. For example, VLDPE may be blended with any of other resins such as EVA, EEA, acid-modified VLDPE, and the like, to the extent that does not impair what is intended by the present disclosure. Further, to the extent that does not impair what is intended by the present disclosure, the resin forming the inner sheath layer may contain any of various additives such as antioxidant, coloring agent, besides the aforementioned flame retarder.

When the cable is an EPB cable, the inner sheath layer has a thickness preferably in a range from 0.3 mm to 1.5 mm, more preferably in a range from 0.45 mm to 1.2 mm.

(5) Outer Sheath Layer (Second Coating Layer)

The outer sheath layer of the cable is often required to be flame-retardant. In the case of a cable mounted on a vehicle such as EPB cable, the outer sheath layer is likely to be damaged due to stone damage or the like while the vehicle is running, and is likely to wear. As the material forming the outer sheath layer, a resin excellent in resistance to scratch and/or wear resistance is therefore required. The material further excellent in flexibility is required in order to make the cable flexible.

In view of the above, as the material forming the outer sheath layer, a resin that is flame-retardant and excellent in resistance to scratch and flexibility is preferred. Particularly in terms of the resistance to scratch and the flexibility, for example, polyurethane resin is preferably used, and particularly flame-retardant polyurethane resin is preferably used. When the cable is an EPB cable, usually the outer sheath layer has a thickness preferably in a range from 0.3 mm to 0.7 mm. The resin forming the outer sheath layer may be cross-linked by applying ionizing radiation or the like.

(6) Example Embodiments of the Insulated Electrical Cable of the Present Disclosure (A) Example Embodiment 1

FIG. 1 is a cross-sectional view of an example embodiment of the insulated electrical cable of the present disclosure. The insulated electrical cable shown in FIG. 1 is a cable to be used as an EPB cable, including: a core wire made up of two insulated wires twisted together; a tape member; and a coating layer made up of two layers i.e., an inner sheath layer and an outer sheath layer.

In FIG. 1, a conductor 1 is shown. Conductor 1 is a stranded wire formed by twisting together about 400 elemental wires made of a copper alloy and having an outer diameter of approximately 0.1 mm, and conductor 1 has an outer diameter of approximately 2 mm to 3 mm. The outer periphery of conductor 1 is covered with an insulating layer 2 made of a flame-retardant polyethylene and having a thickness of approximately 0.5 mm, and accordingly an insulated wire 3 is formed. Two insulated wires 3 thus formed are twisted together to form a core wire 4.

A tape member 5 is helically wound around the outer periphery of core wire 4 to cover the entire outer periphery of core wire 4. Tape member 5 is a tape of thin paper made of pulp, having a width of approximately 3 mm to 5 mm and a thickness of approximately 0.033 mm.

In FIG. 1, an inner sheath layer (first coating layer) 6 and an outer sheath layer (second coating layer) 7 are shown. Inner sheath layer 6 is made of VLDPE at a density in a range from $0.85/cm^3$ to $0.89 \ cm^3$, and has a thickness of approximately 0.6 mm. Inner sheath layer 6 has an elastic modulus A at $-30°$ C. in a range from 10 MPa to 1000 MPa, and has an elastic modulus A at $-30°$ C. and a coefficient of linear expansion B satisfying $A \times B < 0.5$ (MPa/° C.). Further, the inner sheath layer has an elastic modulus A at $-30°$ C. and an elastic modulus C at $25°$ C. satisfying $A/C < 30$.

Outer sheath layer 7 is made of a flame-retardant polyurethane resin blended with a flame retarder, and has a thickness of approximately 0.5 mm.

(B) Example Embodiment 2

Figure 2:
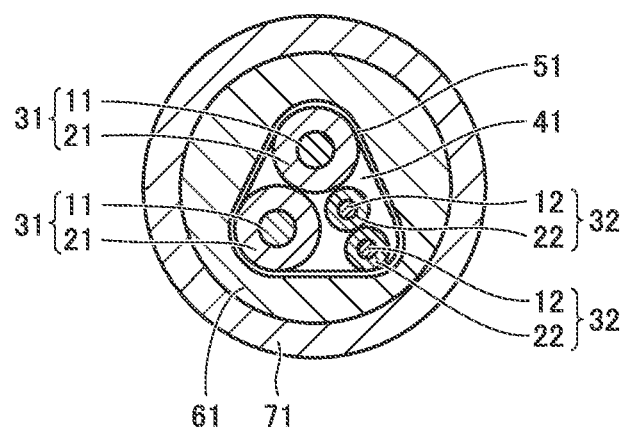
FIG. 2 is a cross-sectional view showing a structure of another example embodiment of an insulated electrical cable of the present disclosure.

FIG. 2 is a cross-sectional view of another example embodiment of the insulated electrical cable of the present disclosure. The insulated electrical cable shown in FIG. 2 is a cable to be used for EPB and WSS, includes a core wire made up of four insulated wires twisted together, and includes a coating layer made up of two layers.

In FIG. 2, conductors 11 and 12 are shown. Conductor 11 is a stranded wire formed by twisting together about 400 elemental wires made of a copper alloy and having an outer diameter of approximately 0.1 mm, and conductor 11 has an outer diameter of approximately 2 mm to 3 mm. The outer periphery of conductor 11 is covered with an insulating layer 21 made of a flame-retardant polyethylene and having a thickness of approximately 0.4 mm, and accordingly an insulated wire 31 is formed. Insulated wire 31 transmits electricity for the EPB. Conductor 12 is a stranded wire formed by twisting together 48 elemental wires made of a copper alloy and having an outer diameter of approximately 0.1 mm, and conductor 12 has an outer diameter of approximately 1.5 mm to 2.5 mm. The outer periphery of conductor 12 is covered with an insulating layer 22 made of a flame-retardant polyethylene and having a thickness of approximately 0.4 mm to 0.8 mm, and accordingly an insulated wire 32 is formed. Insulated wire 32 transmits electricity for the WSS. Two insulated wires 31 and two insulated wires 32 thus formed are twisted together to form a core wire 41.

A tape member 51 is helically wound around the outer periphery of core wire 41, to cover the entire periphery of core wire 41. As tape member 51, a tape having a width and a thickness similar to those of tape member 5 in Example Embodiment 1 may be used. As the material forming tape member 51, a material similar to that for tape member 5 may be used.

In the insulated electrical cable in the embodiment shown in FIG. 2, the inner sheath layer covers the outer periphery of tape member 51 (core wire 41), and the outer sheath layer covers the outer periphery of the inner sheath layer. In FIG. 2, an inner sheath layer 61 and an outer sheath layer 71 are shown.

The thickness of inner sheath layer 61 may be similar to the thickness of inner sheath layer 6 in Example Embodiment 1, and the material forming inner sheath layer 61 is also VLDPE similar to the material for inner sheath layer 6. The thickness of outer sheath layer 71 may be similar to the thickness of outer sheath layer 7 in Example Embodiment 1, and the material for outer sheath layer 71 may also be similar to the material for outer sheath layer 7.

(7) Method of Manufacturing the Insulated Electrical Cable of the Present Disclosure Next, a method of manufacturing the insulated electrical cable of the present disclosure is described.

The insulated wire can be manufactured by covering the outer periphery of the conductor as described above, with an insulating resin that is a material to form the insulating layer. The conductor can be covered with the insulating resin by a method similar to that for manufacturing the known insulated wires, for example, by the melt extrusion of the insulating resin by means of a known extruder.

The core wire is made up of a single insulated wire manufactured in the above-described way, or made up of two or more insulated wires manufactured in the above-described way and twisted together into the core wire. The insulated wires can be twisted together, for example, by feeding, to twisting means (device for twisting a plurality of insulated wires), the insulated wires respectively from two or more supply reels on which the insulated wires are wound. For example, a tape member fed from a tape supply reel (reel on which the tape member is wound) is wound around the core wire thus formed, to thereby form a tape-covered core wire (core wire having its outer periphery covered with the tape member). The tape member is wound helically around the outer periphery of the core wire, for example.

The tape-covered core wire is conveyed to an inner sheath layer coating unit in which the outer periphery of the core wire is coated with a resin material such as VLDPE, and accordingly an inner sheath layer is formed. The core wire can be coated with the resin material by, for example, the melt extrusion of the resin material onto the outer periphery of the tape-covered core wire, by means of a known extruder. After the inner sheath layer is formed, the wire is conveyed to an outer sheath layer coating unit in which the outer periphery of the inner sheath layer is covered with a resin material for forming an outer sheath layer, and accordingly the outer sheath layer is formed. Thus, the insulated electrical cable of the present disclosure is manufactured. The resin forming the inner sheath layer or the outer sheath layer may be cross-linked by applying ionizing radiation or the like as described above. The above-described cross-linking of the resin may be done by a method according to which ionizing radiation or the like is applied to the cable after the outer sheath layer is formed. The resin forming the outer sheath layer can be cross-linked to thereby improve the scratch resistance of the insulated electrical cable.

EXAMPLES

In the following, the present disclosure is described specifically based on Examples. The present invention, however, is not limited to the following Examples.

(1) Materials Forming the Insulated Electrical Cable Subjected to Bending Test

The following materials were used to prepare an insulated electrical cable to be subjected to a bending test.
1) Material forming the insulating layer: flame-retardant polyethylene resin
2) Material forming the inner sheath layer:
   VLDPE1 (density 0.862 g/cm$^3$, Tafmer DF610 manufactured by Mitsui Chemicals, Inc.)
   VLDPE2 (density 0.885 g/cm$^3$, Tafmer DF810 manufactured by Mitsui Chemicals, Inc.)
   VLDPE3 (density 0.905 g/cm$^3$, Tafmer DF110 manufactured by Mitsui Chemicals, Inc.) EVA (Evaflex EV360 manufactured by Mitsui Du Pont)
3) Material forming the outer sheath layer: flame-retardant polyurethane resin
4) Material forming the tape member: thin paper (thickness: 30 μm, width: 3 mm)

(2) Preparation of the Insulated Electrical Cable Subjected to Bending Test 52 elemental wires each made of a copper alloy and having an outer diameter of 0.08 mm were twisted together into a stranded wire, and seven stranded wires were further twisted together into a stranded wire having an outer diameter of 2.0 mm, and this stranded wire was used as a conductor. Around the outer periphery of the conductor, an insulating layer having a thickness of 0.4 mm was formed by the melt extrusion of flame-retardant polyethylene, to thereby form an insulated wire.

Two insulated wires thus formed were twisted together to form a core wire. Around the outer periphery of the core wire thus prepared, a tape member was helically wound with a winding width of 3 mm to form a single layer covering the outer periphery of the core wire. The outer periphery of the core wire around which the tape member was wound was covered with the resin (composition) for forming the inner sheath layer indicated in Table 1 by the melt extrusion, to form an inner sheath layer of 0.5 mm in thickness.

After this, it was covered with flame-retardant polyurethane resin by the melt extrusion, to form an outer sheath layer of 0.5 mm in thickness. Thus, the insulated electrical cable to be subjected to a bending test was prepared.

(3) Measurement of Elastic Modulus (−30° C., 25° C.) and Coefficient of Linear Expansion (−30° C.)

Each resin (composition) to form the inner sheath layer indicated in Table 1, i.e., the resin (composition) which is the same as the resin (composition) to form the inner sheath layer used for preparing the insulated electrical cable to be subjected to the bending test as described above, was subjected to the melt extrusion to prepare a sample for measuring the elastic modulus and the coefficient of linear expansion. For each prepared sample, the storage elastic modulus was measured in a range from −50° C. to 200° C. in accordance with JIS-K7244-1 (1998), using a dynamic viscoelasticity meter ("DVA200" from IT Measurement and Control), under the conditions that strain was 0.08%, frequency was 10 Hz, and temperature rise rate was 10° C./min. The storage elastic modulus at −30° C. and 25° C. of each sample obtained from this measurement is indicated respectively in the cells "−30° C. A" and "25° C. C" of "elastic modulus" in Table 1.

Further, in the cell "coefficient of linear expansion (−30° C.)" in Table 1, a value is indicated that is determined by dividing the difference between the sample length at −30° C. and the sample length at 25° C. measured under the conditions that strain is 0.08%, frequency is 10 Hz and temperature rise rate is 10° C./min, by the sample length at 25° C. and the temperature difference (55° C.).

(4) Bending Test

On the prepared insulated electrical cable to be subjected to a bending test as described above, a bending test was conducted by a method according to JIS C 6851 (2006) (optical fiber test procedures).

Figure 3:
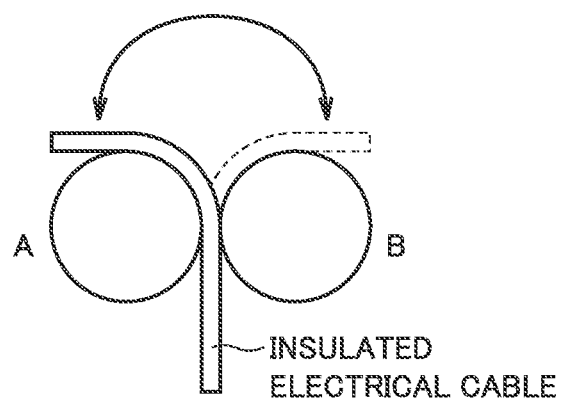
FIG. 3 schematically shows a method of a bending test in an Example.

Specifically, as shown in FIG. 3, two mandrels A and B having a diameter of 60 mm were arranged in parallel in the horizontal direction, and the insulated electrical cable to be subjected to a bending test was held vertically between the mandrels. A process in which the upper end of the cable was bent by 90° in the horizontal direction to abut against an upper part of one mandrel A, and thereafter bent by 90° C. in the horizontal direction to abut against an upper part of the other mandrel B, was repeated in a constant-temperature bath at −30° C. During this repetition, two conductors in the cable were connected to measure the resistance value. The count of repetitions at the time when the resistance had increased to a resistance of 10 times as high as the original resistance value, was used as an indicator of the flex resistance (bending count 1 corresponds to a cycle in which the cable is bent rightward, then leftward, and then rightward again). The result is indicated in "bending count" in Table 1.

TABLE 1

| | type of resin | sample 1 | sample 2 | sample 3 | sample 4 | sample 5 | sample 6 | sample 7 |
|---|---|---|---|---|---|---|---|---|
| resin composition (*) to form inner sheath layer | VLDPE1 | 100 | — | 80 | 50 | 20 | — | — |
| | VLDPE2 | — | 100 | — | — | — | — | — |
| | VLDPE3 | — | — | — | — | — | 100 | — |
| | EVA | — | — | 20 | 50 | 80 | — | 100 |
| elastic modulus | −30° C. A | 40 | 250 | 80 | 500 | 700 | 1050 | 1100 |
| | 25° C. C | 6 | 35 | 8 | 20 | 20 | 130 | 30 |
| coefficient of linear expansion (−30° C.) B (×10$^{-4}$/° C.) | | 1.20 | 1.00 | 1.60 | 2.00 | 1.00 | 1.00 | 1.20 |
| A × B (MPa/° C.) | | 0.0048 | 0.025 | 0.0128 | 0.1 | 0.07 | 0.105 | 0.132 |
| A/C | | 6.7 | 7.1 | 10.0 | 25.0 | 35.0 | 8.1 | 36.7 |
| bending count | | 50000 | 30000 | 40000 | 30000 | 12000 | 10000 | 10000 |

* parts by mass

As shown in Table 1, Samples 1 to 5 in which the inner sheath layer has an elastic modulus A at −30° C. in a range from 10 MPa to 1000 MPa exhibit a bending count of more than 10000, and accordingly have excellent flex resistance at low temperatures. In particular, Samples 1 to 4 in which the inner sheath layer is made of a resin containing more than or equal to 40% by mass of a very low density polyethylene (VLDPE) at a density of more than or equal to 0.85 g/cm$^3$ and less than or equal to 0.89 g/cm$^3$ and having the elastic modulus A of 500 MPa or less exhibit a bending count of more than 30000, and accordingly have particularly excellent flex resistance.

In contrast, Samples 6 and 7 in which the inner sheath layer has an elastic modulus A at −30° C. of more than 1000 MPa exhibit a bending count of 10000 or less and thus have no sufficient flex resistance.

These results indicate that the inner sheath layer having an elastic modulus A at −30° C. in a range from 10 MPa to 1000 MPa enables excellent flex resistance at low temperatures of the insulated electrical cable. Further, the inner sheath layer having an elastic modulus A of 500 MPa or less enables particularly excellent flex resistance, which is more preferred.

As for Sample 6 in which the inner sheath layer is made of VLDPE at a density of higher than 0.90 g/cm$^3$, the elastic modulus A is higher than 1000 MPa and thus no sufficient flex resistance is obtained.

REFERENCE SIGNS LIST

1, 11, 12 conductor; 2, 21, 22 insulating layer; 3, 31, 32 insulated wire; 4, 41 core wire; 5, 51 tape member; 6, 61 inner sheath layer; 7, 71 outer sheath layer

The invention claimed is:

1. An insulated electrical cable comprising:
   a core wire made up of at least one insulated wire including a conductor and an insulating layer covering the conductor;
   an inner sheath layer covering the core wire;
   an outer sheath layer covering the inner sheath layer; and
   a tape member disposed between the core wire and the inner sheath layer and covering the core wire, the inner sheath layer having an elastic modulus A at −30° C. in a range from 10 MPa to 1000 MPa.

2. The insulated electrical cable according to claim 1, wherein the inner sheath layer has an elastic modulus A (MPa) at −30° C. and a coefficient of linear expansion B (/° C.) satisfying A×B<0.5 (MPa/° C.).

3. The insulated electrical cable according to claim 1, wherein the inner sheath layer has an elastic modulus A at −30° C. and an elastic modulus C at 25° C. satisfying A/C<30.

4. The insulated electrical cable according to claim 1, wherein the inner sheath layer is made of a resin containing more than or equal to 40% by mass of a very low density polyethylene at a density of more than or equal to 0.85 g/cm$^3$ and less than or equal to 0.89 g/cm$^3$.

5. The insulated electrical cable according to claim 1, wherein the insulated electrical cable is an insulated electrical cable to be mounted on a vehicle.

6. The insulated electrical cable according to claim 5, wherein the insulated electrical cable is an insulated electrical cable for an electric parking brake.

* * * * *